United States Patent
Gelal et al.

(10) Patent No.: US 8,964,622 B2
(45) Date of Patent: Feb. 24, 2015

(54) COCKTAIL PARTY: SIDE CONVERSATIONS AND TALKING OVER IN WIRELESS MESH NETWORKS

(71) Applicants: Ece Gelal, Urla (TR); Eren Soyak, Uskudar (TR); Metin Ismail Taskin, Uskudar (TR)

(72) Inventors: Ece Gelal, Urla (TR); Eren Soyak, Uskudar (TR); Metin Ismail Taskin, Uskudar (TR)

(73) Assignee: AirTies Kablosuz Iletisim Sanayi ve Dis Ticaret AS, Istanbul (TR)

( * ) Notice: Subject to any disclaimer, the term of this patent is extended or adjusted under 35 U.S.C. 154(b) by 0 days.

(21) Appl. No.: 13/972,736

(22) Filed: Aug. 21, 2013

(65) Prior Publication Data
US 2014/0254459 A1 Sep. 11, 2014

Related U.S. Application Data

(60) Provisional application No. 61/776,636, filed on Mar. 11, 2013.

(51) Int. Cl.
| | |
|---|---|
| *H04H 20/71* | (2008.01) |
| *H04L 12/26* | (2006.01) |
| *H04W 4/00* | (2009.01) |
| *H04L 12/18* | (2006.01) |

(Continued)

(52) U.S. Cl.
CPC ............ *H04L 12/18* (2013.01); *H04W 4/06* (2013.01); *H04W 74/0808* (2013.01); *H04W 40/246* (2013.01); *H04W 84/12* (2013.01)
USPC ........................... 370/312; 370/225; 370/338

(58) Field of Classification Search
None
See application file for complete search history.

(56) References Cited

U.S. PATENT DOCUMENTS

| 5,805,602 A | 9/1998 | Cloutier et al. |
| 7,499,446 B1 | 3/2009 | Gou et al. |

(Continued)

FOREIGN PATENT DOCUMENTS

EP 2383935 A2 11/2011

OTHER PUBLICATIONS

Air 5440 300Mbps Wireless ADSL2+ 4 Port Router data sheet (Web address: http://www.airties.com/product-details.asp?pn=Air5440&i=2&ci=104&cat1=Wireless+Products+&cat2=Wireless+DSL+Modem%2FGateways&dil=eng) (prior to Mar. 19, 2012.

(Continued)

*Primary Examiner* — Edan Orgad
*Assistant Examiner* — Rebecca Song
(74) *Attorney, Agent, or Firm* — Harness, Dickey & Pierce, P.L.C.

(57) ABSTRACT

The present disclosure proposes a method for minor modifications to the Distributed Coordination Function (DCF) channel access mechanism in order to enable a greater number of concurrent communications in a unit area in compliance with the current protocol design. The method comprises equipping nodes with wider neighborhood information than what is obtained with IEEE 802.11, and with a device calibration that equips the device with the knowledge of its performance in the presence of interference. The present disclosure medium access mechanism increases the aggregate throughput with every additional concurrent communication that is enabled in the shared medium. Cocktail Party-capable devices can fairly coexist with 802.11 legacy DCF devices, and co-operate with these devices in the same network without changes to those devices or to the standard. The same or similar mechanisms can be applied to other systems and standards in order to enable concurrent communications in the same contention area.

25 Claims, 7 Drawing Sheets

(51) Int. Cl.
*H04W 4/06* (2009.01)
*H04W 74/08* (2009.01)
*H04W 40/24* (2009.01)
*H04W 84/12* (2009.01)

(56) References Cited

U.S. PATENT DOCUMENTS

| | | | |
|---|---|---|---|
| 7,693,130 | B2 | 4/2010 | Barry et al. |
| 7,787,436 | B2 | 8/2010 | Kish et al. |
| 7,920,475 | B2 | 4/2011 | Lee |
| 7,936,695 | B2 | 5/2011 | Oran |
| 8,023,419 | B2 | 9/2011 | Oran |
| 2011/0014910 | A1 | 1/2011 | Yonge, III et al. |
| 2012/0134347 | A1* | 5/2012 | Kang et al. ............ 370/338 |
| 2013/0242862 | A1 | 9/2013 | Birlik |
| 2013/0272115 | A1* | 10/2013 | Salonidis et al. ......... 370/225 |
| 2014/0211662 | A1* | 7/2014 | Retana et al. ........... 370/255 |

OTHER PUBLICATIONS

Air 4420 300Mbps 2,4/5Ghz Wireless Video Streaming Media Server data sheet (Web address: http://www.airties.com/product-details.asp?pn=Air%204420&i=2&ci=104&cat1=Wireless+Products+&cat2=AP%2FRouter%2C+Mesh+point%2C+Disk+%26+Print+Server&dil=eng) (prior to Mar. 19, 2012).

PCT Partial International Search Report for International Application No. PCT/IB2014/000277 dated Sep. 19, 2014.

Kim, S., et al, "Design and theoretical analysis of throughput enhanced spatial reuse distributed coordination function for IEEE 802.11", IET Communications, Dec. 7, 2009, vol. 3, No. 12, pp. 1934-1947.

PCT International Search Report for International Application No. PCT/IB2014/000277 dated Nov. 12, 2014.

* cited by examiner

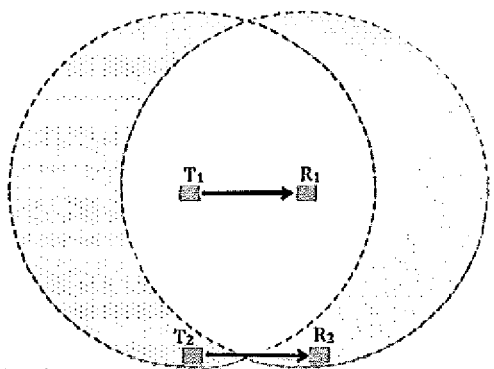
FIGURE 1
FIGURE 2
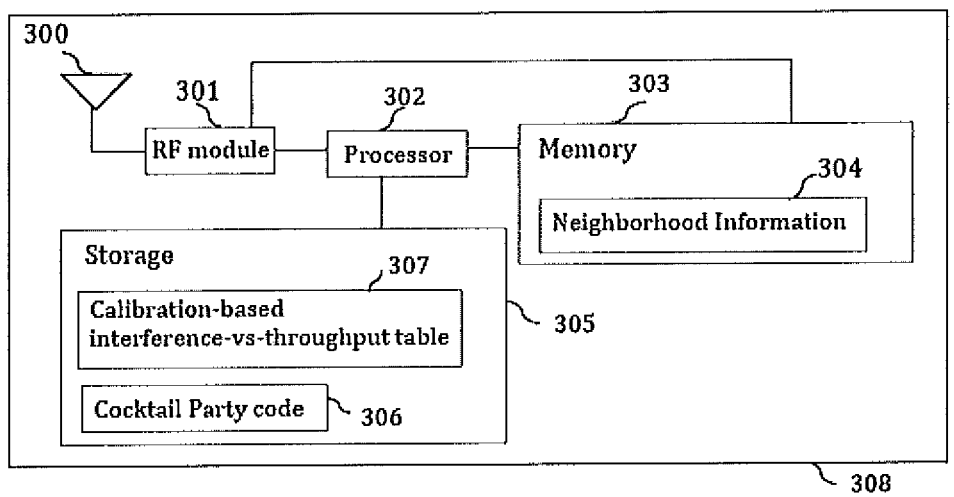
FIGURE 3

|  | RSSI (primary transmitter -whose signal is decoded-) | | | | |
|---|---|---|---|---|---|
|  | -30 dBm | -35dBm | -40dBm | -45dBm | -50dBm |
| RSSI (secondary transmitter - the interferer) -65dBm | 68Mbps | 65Mbps | 60Mbps | 55Mbps | 45Mbps |
| -70dBm | 70Mbps | 68Mbps | 66Mbps | 58Mbps | 50Mbps |
| -75dBm | 93Mbps | 85Mbps | 82Mbps | 64Mbps | 65Mbps |
| -80dBm | 96Mbps | 88Mbps | 85Mbps | 80Mbps | 78Mbps |
| -85dBm | 100Mbps | 95Mbps | 90Mbps | 85Mbps | 80Mbps |

FIGURE 12A

| My Neighbor | My Neighbor's Neighbors |
|---|---|
| 202 | 203, 208 |
| 207 | 208 |

FIGURE 12B

| My Neighbor's ID | RSSI from Neighbor (dBm) | My Neighbor's Neighbors | |
|---|---|---|---|
| 202 | -66 | ID | RSSI from Neighbor |
|  |  | 203 | -35 |
|  |  | 208 | -65 |
| 207 | -51 | ID | RSSI from Neighbor |
|  |  | 208 | -52 |

FIGURE 12C

COCKTAIL PARTY: SIDE CONVERSATIONS AND TALKING OVER IN WIRELESS MESH NETWORKS

RELATED APPLICATIONS

This application is related to provisional U.S. Patent Application No. 61/776,636 filed on Mar. 11, 2013.

STATEMENT REGARDING FEDERALLY SPONSORED RESEARCH AND DEVELOPMENT

N/A

BACKGROUND OF THE INVENTION

1. Field of the Invention

The present invention is related to wireless networks, where nodes may communicate via different communication standards and technologies such as IEEE 802.11 or WiFi Direct.

2. Discussion of the Background

The medium access control (MAC) standards that are used in wireless networks that operate in a distributed fashion (e.g., mesh, ad hoc) offer a sub-optimal temporal and spatial utilization of the wireless medium. For example, the fundamental distributed medium access method of the IEEE 802.11 Wireless Local Area Network (WLAN) MAC standard, known as the Carrier Sense Multiple Access with Collision Avoidance (CSMA/CA), suffers from the so-called "exposed node" problem, which happens when a node defers its transmission due to a neighboring transmitter even though its transmission would not interfere with the existing one due to the positions of the corresponding two receivers.

A wireless node can successfully decode any received signal if its reception strength is greater than the noise (and interference, if exists) level by a certain ratio. To ensure that this ratio is met for a receiver, the IEEE 802.11 Distributed Coordination Function (DCF) MAC standard allows only a single data communication at a time in the wireless medium shared by a group of nodes. Every other node that hears an ongoing transmission in the medium defers its own transmission. In other words, every potential transmitter that is a neighbor of an active (i.e., currently transmitting) transmitter must always defer its own transmission.

In FIG. 1, the IEEE 802.11 DCF MAC standard compliant transmitter T2 always defers its transmission to node R2 when there is an ongoing communication between nodes T1 and R1. In this topology, node R2 is outside of the communication range of T1. (The dot-shaded circular region centered at T1 is drawn to represent the communication range of T1. In practice, the communication range of a node forms an imperfect shape instead of a circle, with an asymmetric reach in every direction due to the wireless propagation characteristics in a given environment.) Similarly, R1 is outside the communication range T2. In this topology, in fact, the transmissions T1-to-R1 and T2-to-R2 can be performed concurrently as neither of their corresponding receivers can hear from the other transmitter but only from their target transmitter (the one they are trying to receive from).

This impact can be observed in FIG. 2 as well. In this figure, a dotted line between nodes indicates that the nodes are within communication distance of each other, and a straight (directional) line indicates an ongoing communication. While AP 202 is transmitting unicast packets to AP 203, AP 208 decodes the MAC headers of 202's data packets and thus learns about the active communication in the medium: its source, target, and duration. According to the IEEE 802.11 MAC standard, AP 208 cannot transmit until the ongoing communication is complete. However, in this topology, a transmission from 202 to 203 would not interfere with the transmission from 208 to 207, because node 207 cannot receive signals from transmitter 202, and node 203 cannot receive signals from 208. Cocktail Party is designed in order to alleviate the capacity under-usage introduced by the unneeded withdrawal of transmission.

SUMMARY OF THE INVENTION

The disclosed invention is aimed at increasing the aggregate throughput of the distributed wireless system as a whole. The premise is that multiple communications can be concurrently carried out in the distributed network without the need for a central coordination mechanism. This phenomenon can be likened to the way concurrent conversations are carried about between multiple people in a cocktail party.

The current disclosure elaborates on the implementation details of "Cocktail Party" algorithm with the IEEE 802.11 DCF MAC standard; however, implementation with other wireless technologies and systems is also possible.

The disclosed invention proposes no changes to the CSMA-based transmission mechanism defined by the IEEE 802.11 DCF MAC standard for the case when the medium is idle. A potential transmitter node ("a potential speaker") can start transmitting after the random backoff as specified by the standard, if it senses that the medium is idle throughout the duration of the backoff.

The disclosed invention proposes a minor change to the CSMA-based transmission mechanism defined by the IEEE 802.11 wireless MAC standard for the case when the medium is busy. The IEEE 802.11 DCF MAC protocol does not allow nodes to transmit when they sense the medium to be busy by another communication. According to the disclosed invention, while there is an ongoing communication between T1 and R1 (on the directional link (T1, R1)), a potential transmitter node T2 can start transmitting to a receiver R2 satisfying there is no link between T1 and R2 and no link between T2 and R1 (i.e., signals of T1 are not received by R2 and signals of T2 are not received by R1).

According to the disclosed invention, in addition to the above case, a potential transmitter node ("a potential speaker") T2 may also start transmitting to R2 while there is an ongoing communication on the link (T1, R1) and either there is a link (T1, R2) or a link (T2, R1) (i.e., signals of T1 are received at R2 or signals of T2 are received at R1). In this case, T2's decision on whether to transmit is given based on the system-specific criterion for justifying introducing an interfering transmission (described later).

In a further embodiment of the disclosed invention, while there is an ongoing communication on the link (T1, R1), a potential secondary speaker node T2, whose signals are received by the active receiver R1 as well as its target receiver R2, and whose transmission does not satisfy the system-specific criterion to introduce an interfering transmission, can reduce its transmission power to get out of the one-hop neighborhood of the active receiver R1 while it can still transmit at the same data rate to its target receiver R2 (or at a data rate that is sufficient to satisfy the required Quality of Service of the application that induces this data flow). T2 must still ensure that its target receiver R2 is not in the neighborhood of the active transmitter T1. In addition, when it is not possible for the potential transmitter node T2 to get out of the one-hop neighborhood of R1, if T2's concurrent transmission with a reduced power satisfies the system-specific criterion for introducing an interfering transmission, T2 may initiate a concurrent transmission.

The present disclosure describes the implementation details for a Cocktail Party with two simultaneous conversations; however, concurrent communications among more simultaneous pairs in the shared medium is also possible.

Aside from the neighbor discovery phase, the disclosed invention introduces no additional message exchange among nodes on top of the IEEE 802.11 DCF MAC standard in order to realize Cocktail Party communications. Aside from a minor addition to the beacon format or to the control frame format, Cocktail Party requires no changes in the packet formats defined by the IEEE 802.11 wireless MAC standard. No additional device is needed to coordinate all nodes in the network in order to realize Cocktail Party communications. The Cocktail Party decision mechanism is executed independently at each potential transmitter node based on the dynamic medium occupancy and the local neighborhood information. Cocktail Party communications can fairly coexist with today's DCF-based 802.11 deployments (e.g., 802.11n) without any changes to the current deployment; Cocktail Party-capable devices can operate in the same network with widely deployed legacy DCF devices.

One aspect of the present invention relates to a wireless device N1 for use in a wireless network to be established between N1 and at least three other wireless devices N2, N3 and N4. The wireless device comprises a data storage memory, a program memory, an RF circuit operatively coupled to an antenna, and a processor operative coupled to the RF circuit and at least one memory. A first set of instructions is stored in the program memory of N1 that, when executed, determines whether N3 is actively transmitting to N4 and, if so, then determines whether there are any packets in the memory that are to be transmitted to N2. A second set of instructions also is stored in the program memory that, when executed, determines whether N2 is not capable of receiving signals transmitted from N3 and whether N4 is not capable of receiving signals from N1, and, if both conditions hold, then determines how many packets can be sent to N2 from N1 with their receipt by N2 acknowledged (if communication protocol requires it) in the remaining time that N3 is actively communicating with N4, and gathers the corresponding packets. A third set of instructions also is stored in the program memory that are adapted to be executed after the second set of instructions are executed; the third set of instructions, when executed, cause the gathered packets to be transmitted to N2 from N1 while N3 is transmitting to N4. A further aspect of this embodiment of the invention is that the wireless device can be used in a wireless mesh network that, for example, is compliant with the 802.11 standards. A still further aspect of the present invention is that the second set of instructions, when executed, determines the length of time that N3 is actively communicating with N4 by reference to the time information stored in a media access control header.

In an alternative second set of instructions, the instructions, when executed, determine whether N2 is not capable of receiving signals transmitted from N3 and whether N4 is not capable of receiving signals from N1, and even if either or both of these conditions do not hold, determines whether the concurrent transmission from N1 to N2 while N3 is transmitting to N4 is feasible based on the network topology and device hardware, and if concurrent communications is possible, then determines how many packets can be transmitted from N1 to N2 with their receipt by N2 acknowledged in the remaining time that N3 is actively communicating with N4.

An additional aspect of the present invention is that the first, second and third set of instructions are constructed so that, when executed, are adapted to be used in distributed multi-hop wireless deployments such as wireless ad hoc networks or wireless mesh networks, wherein the network may use one or a hybrid of communication standards such as CSMA/CA, Wi-Fi Direct, Bluetooth, or other communication standards that are yet to emerge after this invention.

An additional aspect of the present invention is that the wireless device on which these instructions operate may be an Access Point (AP), a Wireless Gateway, a Video Bridge, a Station, a Wireless Repeater, and so on.

An additional aspect of the present invention is that the first, second and third set of instructions are constructed so that, when executed, there is no requirement of additional message exchange among nodes to allow packets to be transmitted from N1 to N2 while N3 is transmitting to N4. Rather, the only information needed to allow this to happen is the information that is propagated through, for example, the beacon frames.

An additional aspect of the present invention is that the first, second and third set of instructions are constructed so that, when executed, beacon frames are used to propagate neighborhood information regarding the wireless network. The beacons are transmitted with a coarse period, only to refresh neighborhood information. There is no need in accordance with the present invention to handshake (exchange packets both ways) prior to every concurrent communication or to handshake in order to agree to form concurrent communication pairs.

An additional aspect of the present invention is that the first, second and third set of instructions are constructed so that, when executed, any time the wireless device detects an opportunity, it may initiate a concurrent transmission (provided the criteria are met), without requiring a handshake with its receiver.

An additional aspect of the present invention is that the first, second and third set of instructions are constructed so that, when executed, allow N2 to receive from N1 without requiring any additional message exchange among nodes.

An additional aspect of the present invention is that the first, second and third set of instructions are constructed so that, when executed, there is no requirement for any changes to the medium access control mechanism at the receiver nodes (except, for example, the node that will be a Cocktail Party receiver needs to propagate its neighborhood information via beacons).

An additional aspect of the present invention is that the first, second and third set of instructions are constructed so that, they are designed as minor changes to the DCF (Distributed Coordination Function) mechanism of the IEEE 802.11 MAC protocol where each decision is given in a distributed fashion by the nodes. This stands in direct contrast to the prior art, which is primarily designed for IEEE 802.11 MAC protocol's HCF (Hybrid Coordination Function) setup where there is a control mechanism, which operates in a semi-central (a hybrid of centralized and distributed) fashion, and performs bandwidth management, allocates nodes to TXOP (Transmission Opportunities).

An additional aspect of the present invention is that, via the beacons—or other control frames—it receives, the wireless device generates a simple neighborhood table that it uses when deciding when and if to have cocktail party conversations.

An additional aspect of the present invention is that the first, second and third set of instructions are constructed so that, when executed, allow cocktail party conversations to take place in asymmetric topologies where the bandwidth of the communication between two wireless devices differs in the two directions of the communication, due to disparate transmission power, number of antennas, or use of different hardware with different RF processing capabilities.

An additional aspect of the present invention is that the first, second and third set of instructions are constructed so that, when executed, allows a "talk over" to take place, where interfering communications may coexist in a contention area provided they improve a certain network-specific metric such as, for example, improving the utilization of airtime, increasing the aggregate throughput, etc.

An additional aspect of the present invention is that the first, second and third set of instructions are constructed so that, when executed, allow the wireless device to coexist (both in the same network and in separate networks) with CSMA/CA devices that are used in most of today's deployments in the home and in business areas.

An additional aspect of the present invention is that the first, second and third set of instructions are constructed without assumptions that client devices (such as laptops, tablets, phones), which connect to the wireless device N1 (e.g., devices that connect to N1 as a station when N1 is an access point), will implement certain changes in their medium access mechanism, in order to realize concurrent communications among a group of wireless devices including N1.

An additional aspect of the present invention is that the first, second and third set of instructions are constructed so that, when executed, no help of any intermediate nodes or central controller is required to coordinate a cocktail party conversation—rather, the decision making process is completely distributed and relies only on at least local neighborhood information. In accordance with a further embodiment, the access point's built-in calibrated interference versus throughput table can be utilized in the decision making process.

An additional aspect of the present invention is that the first, second and third set of instructions are constructed so that, when executed, there is no requirement of synchronization between the concurrent transmitters, or between these transmitters and their target receivers.

An additional aspect of the present invention is that the first, second and third set of instructions are constructed so that, when executed, there is no requirement of using an RTS-CTS handshake.

An additional aspect of the present invention is that the first, second and third set of instructions are constructed so that they are achievable as a software update to existing off the shelf hardware that can be, for example, downloaded to an existing device over the Internet from a web page.

A still further aspect of the present invention disclosed herein is that, for example and included by reference, the U.S. patent application Ser. No. 13/622,891, included by reference, titled System and Method for Equalizing Transmission Delay in a Network, filed September 2012 can be utilized between a "cocktail party" transmitting and receiving nodes to minimize any jitter that may be caused by the cocktail party transmission of packets.

BRIEF DESCRIPTION OF THE DRAWINGS

The accompanying drawings, which are incorporated herein, constitute part of the specifications and illustrate the preferred embodiment of the invention.

FIG. 1 is a diagram representing the inefficient use of spectrum with the prior art, and the available room for capacity improvement (explained in Clause 4 above);

FIG. 2 is a diagram of an exemplary network, depicting the potential room for improvement in terms of spectrum efficiency via Cocktail Party communications;

FIG. 3 represents the general structure of a Cocktail Party-capable node;

FIG. 12A is an exemplary interference strength-versus-achievable throughput table at a Cocktail Party node;

FIG. 12B is an exemplary Neighborhood Information table belonging to node 208 in FIG. 2. This table would be sufficient if only Side Conversations are allowed in the network.

FIG. 12C is an exemplary Neighborhood Information table belonging to node 208 in FIG. 2. This table is necessary if nodes in the network need to Talk Over with or without power control.

DESCRIPTION OF THE PREFERRED EMBODIMENT

Figure 4:
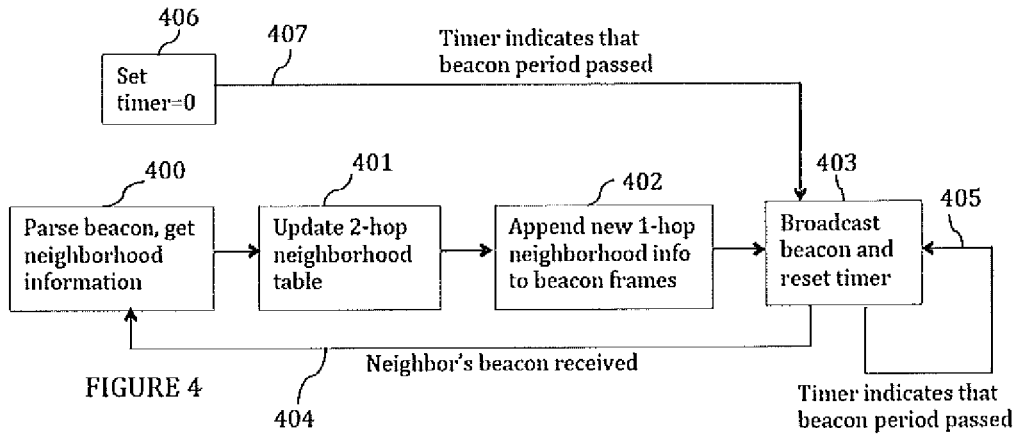
FIG. 4 is a flow diagram representing how Neighborhood Information is collected at the nodes and disseminated again.

FIG. 2 is a block diagram of a wireless network 200. Cocktail Party-capable node may be an Access Point (AP), a Gateway, a Video Bridge or a Station. These nodes may form a mesh, multiple disconnected meshes or may communicate directly with each other. Each communication link 204, 205, 206 may be unidirectional or bi-directional. A communication on a link is directional; in network 200, the communication on link 204 is from transmitter 202 to receiver 203. According to the IEEE 802.11 DCF MAC standard, node 208 cannot transmit while there is an ongoing transmission on link 204.

A Cocktail Party-capable wireless network device contains an RF module, a memory, a processor and a storage unit. FIG. 3 is a diagram showing the internal components of a Cocktail Party-capable node. The memory contains a packet buffer, the address of which is known to both the RF module and the processor. The processor fills up the packet buffer; RF module empties it as it transmits the packets as RF signals. In one embodiment of the proposed invention, the Cocktail Party algorithm code (the algorithm that is executed in order to perform Cocktail Party communications) and the interference strength-versus-achievable throughput table are embedded in the non-volatile storage (305) by manufacturer of the node, or by the manufacturer of the modular wireless hardware that the node uses. In another embodiment, it is also possible to move these components to under the RF module (301). In a further embodiment of the proposed invention, it is possible to move the interference strength-versus-throughput table to the cloud where the device can download a local copy to one of its memory units (volatile or non-volatile), or use the copy on the cloud as long as it has an Internet connection. Neighborhood Information is acquired/updated dynamically and is maintained in the memory; in a further embodiment, this information may also be stored in non-volatile memory—or on the cloud—if it needs to be preserved between power boots.

Neighborhood Discovery: Wireless nodes that operate in a distributed manner (i.e., in a system without a central control mechanism) may perform neighborhood discovery to learn about their local topology. An exemplary method for neighborhood discovery in a wireless network is via periodic broadcast of packets that announce identity. With the IEEE 802.11 DCF MAC protocol, all AP devices periodically broadcast management frames to announce their parameter set. These management frames, called "beacon"s, help the Wi-Fi devices to discover their "one-hop neighborhood", i.e., the set of nodes they hear beacons from.

To facilitate Cocktail Party communications, each node in the wireless network shall report to their neighbors the IDs (e.g., MAC addresses) of the nodes in its one-hop neighborhood. This information may be piggybacked to the periodic AP beacons or inserted in Cocktail Party-specific beacons that are sent less frequently and contain only the neighborhood information. Via propagation of these beacons, each node thus becomes aware of its "two-hop neighborhood", which is the set N1 of nodes that are its neighbors, plus the nodes that are the neighbors of the nodes in N1. Two-hop neighborhood information aids a node in determining whether it can successfully transmit to any of its neighbors without disturbing an ongoing communication if one exists. FIG. 4 is a flow diagram representing how Neighborhood Information is collected at the nodes and disseminated again. Each node periodically transmits beacons containing the list of their one-hop neighbors. Each node maintains a two-hop neighborhood table that looks like the examples shown in FIG. 12B and FIG. 12C. Upon receiving a neighbor's beacon, each node updates its two-hop neighborhood table based on the information in the beacon. The node's next scheduled beacon contains the updated one-hop neighborhood information from this table.

If only non-interfering Cocktail Party communications, i.e., Side Conversation, is allowed in the network, the neighborhood information that a node maintains (and disseminates via its beacons) only needs to contain the IDs of the neighbors; Side Conversation decision only involves who are the neighbors. In this case, the neighborhood table maintained by the nodes looks like the example shown in FIG. 12B and the beacons transmitted by the nodes contain the rows in only the first column of this table. In the example in FIG. 2, the node 207 maintains a neighborhood table that contains the ID of its one-hop neighbor 208 and includes this information in its beacons. When node 208 receives node 207's beacon, it learns that itself is the only neighbor of node 207 and that it can initiate a Side Conversation with node 207 while there is communication on link 204.

If interfering Cocktail Party communications (Talk Over) are also allowed in the network, or furthermore, if power control will be applied, then the neighborhood information also needs to contain the Received Signal Strength Indicator (RSSI) that quantifies the strength of the signals received from each of the one-hop neighbors. Via propagation of this information, each Cocktail Party-capable node becomes aware of the local topology of each of its one-hop neighbors. In this case, the neighborhood table looks like the example shown in FIG. 12C and the beacons transmitted by the nodes must contain the rows in the first and second columns of this table (containing the ID and the beacon RSSI of the neighbor). In the example in FIG. 11, since node 1108 is aware of the RSSI values with which nodes 1103 and 1106 hear its (and other nodes') signals, it can lookup its interference strength-versus-achievable throughput table (such as that shown in FIG. 12A) to decide if a Talk Over is feasible while node 1102 is transmitting on link 1104. In addition, the RSSI information also helps a node to infer the new RSSI value at its neighbors when it transmits with a lower power and thus to determine whether it can reduce its transmit power in order to get out of the neighborhood of one neighbor (e.g. the node that is already receiving from another transmitter), while its transmission can still be successfully decoded at another neighbor (e.g. its target receiver).

The implementation of the proposed invention may be targeted for deployment in wireless networks with asymmetric links. The Wi-Fi network may have asymmetric links among nodes that have disparate transmission power, number of antennas, or RF processing capabilities.

To facilitate Cocktail Party Side Conversations in a network with asymmetric links, nodes need to propagate via their beacons, not only one-hop neighbors list in the first column of FIG. 12B, but the two-hop neighborhood information in the first and second columns of FIG. 12B. In FIG. 2, assume there is an asymmetric link between node 202 and node 207; 207 can hear 202's beacons but 202 cannot hear 207's beacons. Normally, 208 would include in its beacons the ID of its neighbor, 207, and broadcast this information. In a network with asymmetric links, 208 shall include in its beacons, in addition to the ID of 207, the neighbors of 207, which would include 202 and 208. Node 202 could thus become aware that node 207 can hear its signals.

Figure 11:
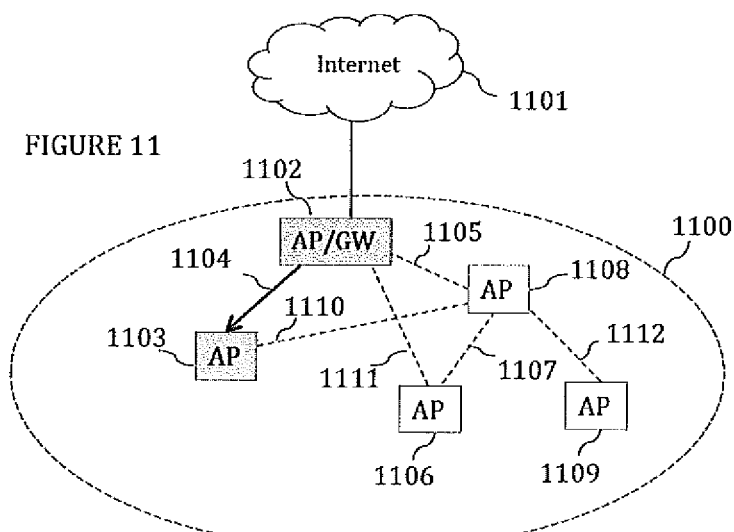
FIG. 11 is a diagram of an exemplary network depicting a scenario that is appropriate for Talk Over.

To facilitate Cocktail Party Talk Over in a network with asymmetric links, nodes must propagate via their beacons, not only the one-hop neighborhood information from the first two columns of FIG. 12C, but also include, for each first-hop neighbor N, the list of node N's one-hop neighbors and their RSSI, i.e., the information stored in the third row of FIG. 12C. In the above example of an asymmetric link in the network 200 in FIG. 2, node 208 includes in its beacons the RSSI at which node 207 hears from node 202; the receivers of this beacon thus become aware of the interference they cause on the asymmetric link. In FIG. 11, assume link 1110 is asymmetric; node 1108 receives the beacons from node 1103 with smaller (or greater) RSSI than that node 1103 receives the beacons of node 1108. By including in its beacons the IDs and the beacon RSSI of the nodes in its two-hop neighborhood, node 1102 can make 1108 aware of the link asymmetry. Thus, 1108 can avoid a collision due to an over-optimistic Talk Over decision or can provide better network utilization by avoiding a conservative decision to not talk over while it could.

In different implementations of the proposed invention, the two-hop neighborhood information may be obtained via different methods, e.g., dissemination of control packets instead of beacons. (For example, with the IEEE 802.11s wireless mesh networking protocol, nodes exchange periodic control frames to update RSSI information regarding their neighbors). In another implementation of the proposed invention, it may be possible to provide the two-hop neighborhood information to the Cocktail Party device manually at initial system setup. The proposed invention may also be implemented in static networks wherein the topology does not change after initial setup. If the neighborhood information does not need to be updated within the lifetime of the network, it is sufficient to propagate these control packets within the network only until the network topology stabilizes.

With the IEEE 802.11 DCF MAC protocol, a node determines whether it can transmit, based on the status of the medium (idle or busy). Two mechanisms aid to determine the status of the medium, namely: (a) "physical carrier sensing" and (b) "Network Allocation Vector (NAV)".

According to CSMA/CA, a potential transmitter node first measures, via its RF module (301, FIG. 3), the signal strength on the channel that it is intending to use. If the medium is idle, the node starts transmitting after counting down a random counter. (If the channel became available after a busy period, this node can transmit after a random counter plus DCF Inter Frame Spacing—DIFS-duration.)

According to CSMA/CA, when a node is transmitting, the MAC headers of its control and data packets contain the information of the transmitter's MAC address, the receiver's MAC address, and the duration of the transmission. NAV is an indicator of medium reservation, which is updated based on the value of the "Duration" field extracted from the received MAC header of RTS and CTS frames that are sent by the transmitter-receiver node pair prior to the actual exchange of data; the duration information is also available in the "Duration/ID" field in the MAC headers of all frames sent during the data communication.

Any node that can decode the MAC header shall update its NAV with the respective information, and defer its transmissions for the duration of the ongoing transmission in the medium, ("Duration/ID" field gives the period of time that the medium is reserved for transmitting the data frame and the returning ACK frame.)

To facilitate Cocktail Party decisions, nodes that overhear any transmitter's MSDU packets (or any of its fragmented frames) shall extract from the MAC header and store, not only the "Duration/ID" value, but also the sender and destination of the ongoing communication which are located in the "Address 1" and "Address 2" fields of the MAC header. In the current disclosure, the database (or table) where the NAV plus the additional medium occupancy information is stored is referred to as the Extended NAV. Along with the two-hop neighborhood information, Extended NAV helps a node in determining whether its transmission would be successful given the ongoing communication (if one exists) in its neighborhood.

If a node cannot decode a received MAC header, it shall mark its Extended NAV indicator to an invalid value or as "N/A" (i.e., not available) for a random duration less than the backoff window size. This case may happen when the MSDUs (or its fragment frames) from two—or more—concurrent transmitters collide at a node that is a neighbor of more than one of these transmitters. This node would not be able to decode these frames and update its Extended NAV correctly; it is essential that this node sets its NAV to mark that there are multiple concurrent transmitters in the medium so that it does not attempt to initiate Cocktail Party Side Conversation or Talk Over.

Cocktail Party communication algorithm proposes no changes to the medium access mechanism defined by the IEEE 802.11 DCF MAC protocol, except for allowing a node to transmit while there is an ongoing communication in the shared medium (channel). In FIG. 2, while the communication on a link 204 is going on, the potential transmitter 208 would have to defer its transmission for the duration of communication on link 204 (i.e., the duration for which the NAV of 208 is set), in order to comply with CSMA/CA. Following the Cocktail Party algorithm, 208 can initiate a Side Conversation with 207. In FIG. 11, node 1108 would have to defer its transmission for the duration of transmission on link 1104 in order to comply with CSMA/CA. With Cocktail Party algorithm, 1108 can Talk Over the ongoing conversation on link 1104. If a Side Conversation or a Talk Over is not possible (even with a reduced transmission power), 208 or 1108 defer their transmissions as they would with CSMA/CA.

Figure 5:
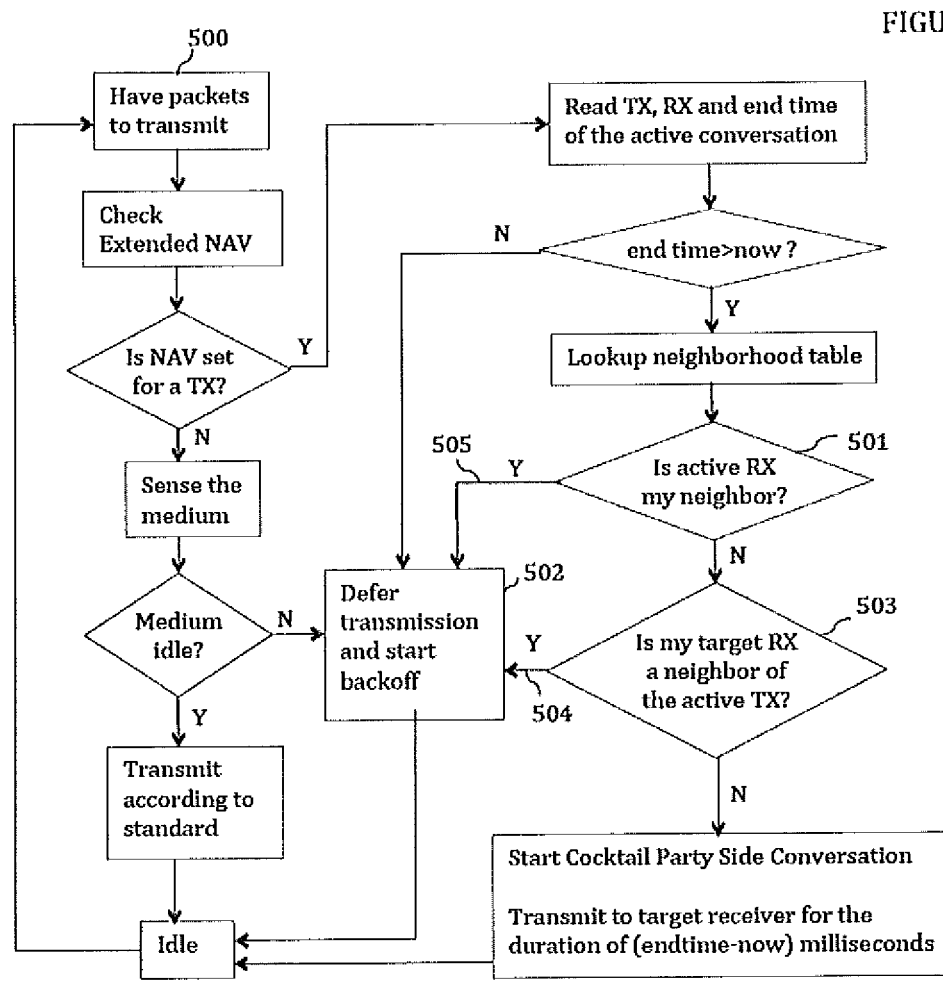
FIG. 5 is a flow diagram depicting the decision mechanism executed by a Cocktail Party speaker before initiating a Side Conversation while there is an ongoing transmission in the medium.

Initiating a Cocktail Party Side Conversation: According to the disclosed invention, a potential Cocktail Party speaker node first looks up its Extended NAV to acquire the information of which transmitter currently has the medium, transmitting to which receiver, and for which duration. In the example in FIG. 2, node 208 has packets to transmit to node 207 while there is an ongoing communication on link 204 (from 202 to 203). 202's MAC header includes 203 and 202 in its "Address 1" and "Address 2" fields, respectively. 208 extracts these Receiver and Source address fields from the MAC header and looks up its neighborhood table to check whether the active receiver 203 is in its neighborhood and whether the node it has packets for (i.e., 207) is in the neighborhood of the active transmitter 202. If 207 is not a neighbor of 202 and 203 is not a neighbor of 208, 208 can start a Side Conversation with 207. In this scenario, the two communications on links 204 and 206 can be carried out side-by-side without degrading each other's performances. This scenario remedies what is referred to in the literature as the "Exposed Node Problem" of 802.11 MAC protocol. FIG. 5 depicts the decision mechanism at a Cocktail Party-capable potential speaker node for initiating a side conversation while there is an ongoing conversation that it can hear from. In different implementations of the proposed invention, the order that the operations in modules 501 and 503 are executed may change. The leftmost block of operations that lead the node to transmit according to the standard may also be executed in a different order in different implementations, as long as the logical connections are not changed to conflict with the standard.

Figure 6:
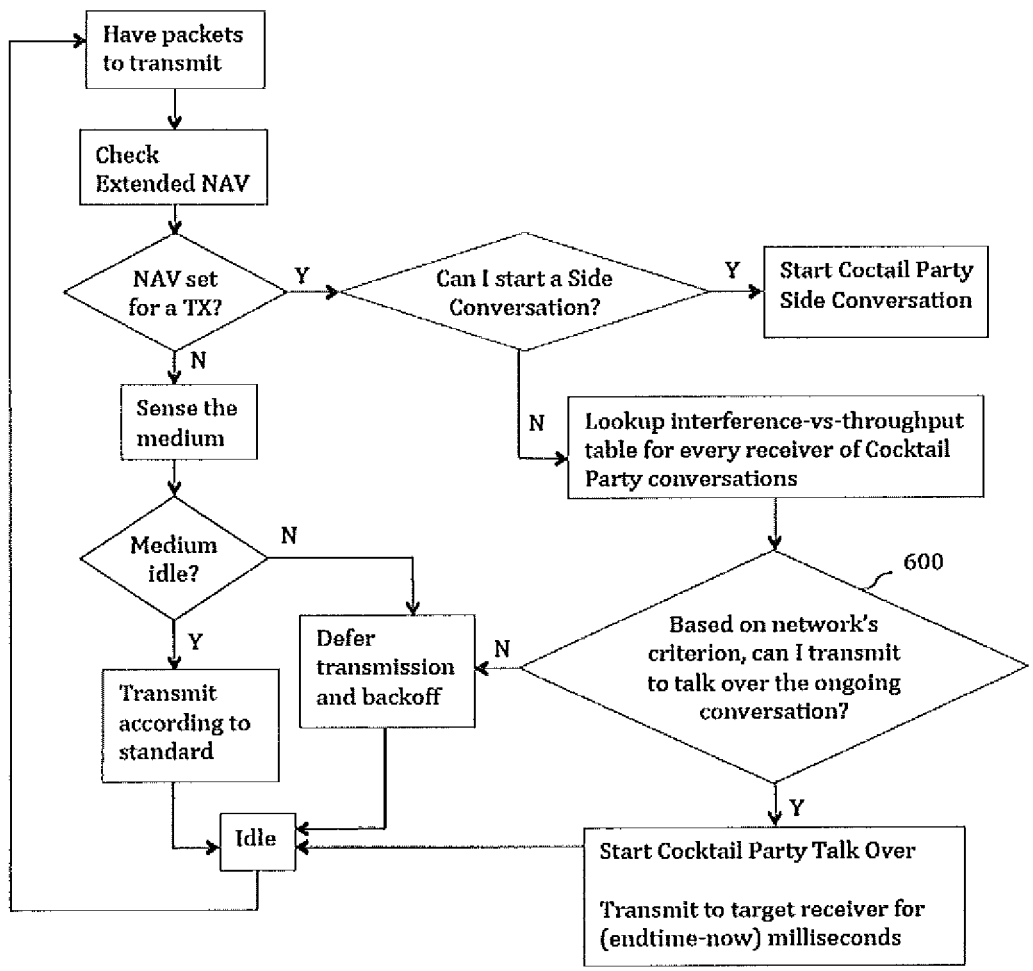
FIG. 6 is a flow diagram depicting the decision mechanism executed by a Cocktail Party speaker before initiating a Talk Over while there is an ongoing transmission in the medium.

Initiating a Cocktail Party Talk Over: A further embodiment of Cocktail Party allows concurrent communications that are not mutually interference-free. While there is an ongoing transmission by one of its neighbors, a potential Cocktail Party speaker node that has determined a Side Conversation would not be possible may check whether it can Talk Over the existing communication. Talking Over, as its name implies, is performed in the scenario when a node transmits even though its transmission interferes with the existing transmission at either or both of the receivers. The node's decision on whether to Talk Over the existing conversation is driven by a lookup of its calibrated interference strength-versus-achievable throughput table and evaluating whether the concurrent communications would satisfy a system-specific criterion. In one implementation of the proposed invention, a Cocktail Party capable node decides to Talk Over if the table lookup indicates that the aggregate throughput per airtime spent will be greater in the network with Talk Over, compared to the case if the node transmits after the existing transmission completes. In another embodiment, a Cocktail Party capable node may decide to transmit if the table lookup indicates that with its transmission, the throughput at every simultaneous receiver that is its neighbor, i.e., every receiver that will be interfered from its transmission, will be more than a constant $\Gamma$, where $0<\Gamma<1$, times the throughput at this receiver without its interference ($\Gamma$ quantifies how tightly the system needs to constrain the degradation in throughput by interfering simultaneous communications with Talk Over). FIG. 6 depicts the decision flow at the potential speaker node before initiating a Talk Over.

In the example in FIG. 11, node 1108 has packets to transmit to node 1106 while there is an ongoing transmission from 1102 to 1103. Potential Cocktail Party speaker node 1108 has extracted the Source and Receiver addresses from 1102's MAC headers, looked up its neighborhood table for these nodes, and determined that a Side Conversation with node 1106 is not possible. 1108 looks up its interference strength-versus-achievable throughput table for receivers 1106 and 1103, to infer the throughput that these devices can attain with the amount of interference they will receive from each other's transmitters. If the attained values satisfy the system-specific criterion, 1108 initiates a Talk Over.

In order to facilitate the decision mechanism for Talk Over, an initial step ensures the calibration of transmission power and reception sensitivity of Cocktail Party-capable devices. In the calibration phase, the reception data rate on the device is measured with an interferer present in its neighborhood for a variety of primary transmitter and interferer RSSI levels. The device shall thus construct an interference strength-versus-achievable throughput table that looks like FIG. 12A. (In this table, any interference must have a lower RSSI compared to the strength of the signals from the target transmitter, so that the target transmitter's signals are successfully decoded at their intended receiver.) Interference-versus-achievable throughput table is constructed once at the device calibration, recorded in the non-volatile memory, and is not updated dynamically. The values that fill up the cells in this table are impacted from the device's reception sensitivity and the RF module's capability in decoding a composite signal when a primary and an interfering signal are received with disparate RSSI levels.

Figure 7:
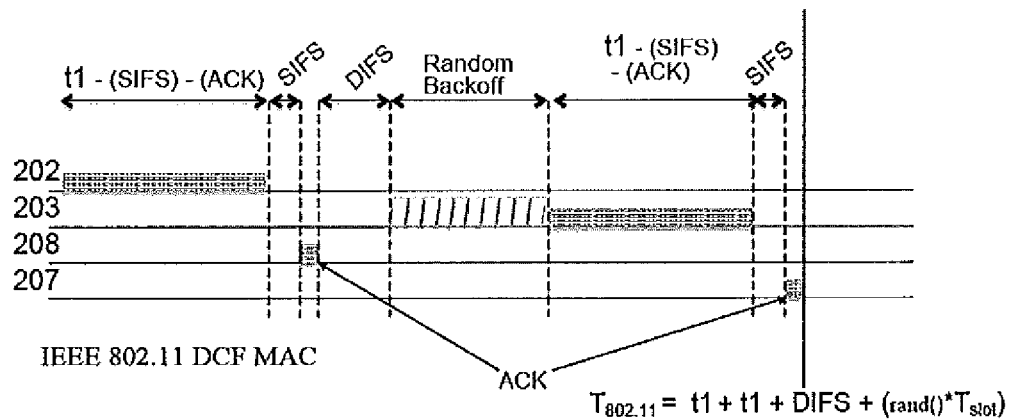
FIG. 7 shows the packet flow in the four-node setting in FIG. 2 for the two nodes 202 and 208 to acquire the channel and transmit using the IEEE 802.11 DCF wireless MAC standard verbatim (the upper flow) and using the Cocktail Party algorithm (the lower flow)
Figure 7:
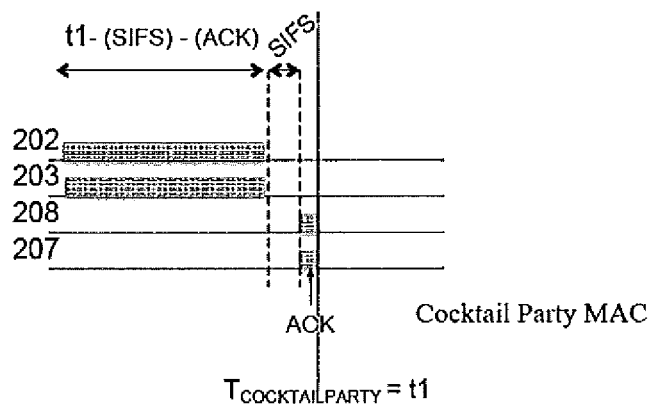

FIG. 7 depicts the packet flow belonging to two communications in the four-node setting in FIG. 2 for the two nodes 202 and 208 to acquire the channel and transmit, using the IEEE 802.11 wireless MAC implementation verbatim (the upper flow) and the Cocktail Party scenario (the lower flow). A comparison of the upper and lower parts of FIG. 7 demonstrates the temporal usage benefits incurred with Cocktail Party concurrent communications.

Figure 8:
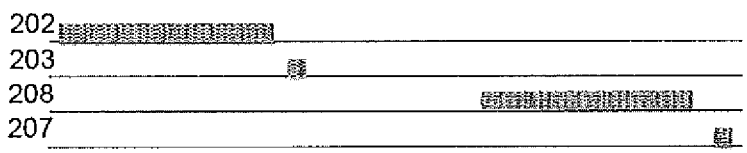
FIG. 8 depicts the channel utilization gain when the two communications from FIG. 7 use the Cocktail Party algorithm versus the prior art for CSMA-based channel access.
Figure 8:

FIG. 8 depicts the packet flow in the same four-node setting, representing how the spectrum usage in the transmissions is doubled by the Cocktail Party algorithm. With Cocktail Party Side Conversation, the aggregate throughput in the network is also doubled in the best case compared to the prior art for CSMA-based systems. With Cocktail Party Talk Over, the aggregate throughput increase compared to prior art depends on the topology, the physical capabilities of the receiver equipment, and the network-specific threshold Γ that defines the level of aggressiveness or conservativeness in the system for when a Cocktail Party capable node may Talk Over.

In a further embodiment of the proposed invention, a Cocktail Party node is capable of adjusting its transmission power level with high precision. With this feature, when there is an ongoing transmission in its neighborhood, a Cocktail Party-capable potential speaker, which is in fact a neighbor of the active receiver, is able to reduce its transmission power to get out of the one-hop neighborhood of the active receiver. If this Cocktail Party node can reduce its transmission power to avoid interfering with the active communication, while it can transmit to its target receiver with a network-specific criterion (described below), it switches to the lower power that satisfies this criterion and begins its transmission. The Cocktail Party node must still ensure that its target receiver is not in the neighborhood of the active transmitter to meet Side Conversation criteria. To facilitate the determination of the power adjustment amount, the Cocktail Party node shall have a neighborhood table that contains the RSSI of its neighbors; this table may be identical to the one required for Cocktail Party Talk Over decisions, which looks like FIG. 12C.

In one embodiment of the proposed invention, a power-controllable Cocktail Party device is allowed to initiate a Side Conversation only if it can transmit to its target receiver at the same data rate when it reduces its transmission power (i.e., reducing the transmission power does not decrease the throughput at the receiver). In another embodiment of the proposed invention, the RF module in the power-controllable Cocktail Party device uses an automatic rate adaptation mechanism, which drives the device to transmit at the most aggressive transmission data rate that can be sustained at a given RSSI level. When such Cocktail Party device reduces its transmission power, it may no longer be able to transmit to its target receiver at the same data rate. In a network and scenario where traffic quality of service requirements can still be met with the decrease in transmission data rate, Cocktail Party may allow nodes to initiate a Side Conversation with the reduced power.

Figure 9:
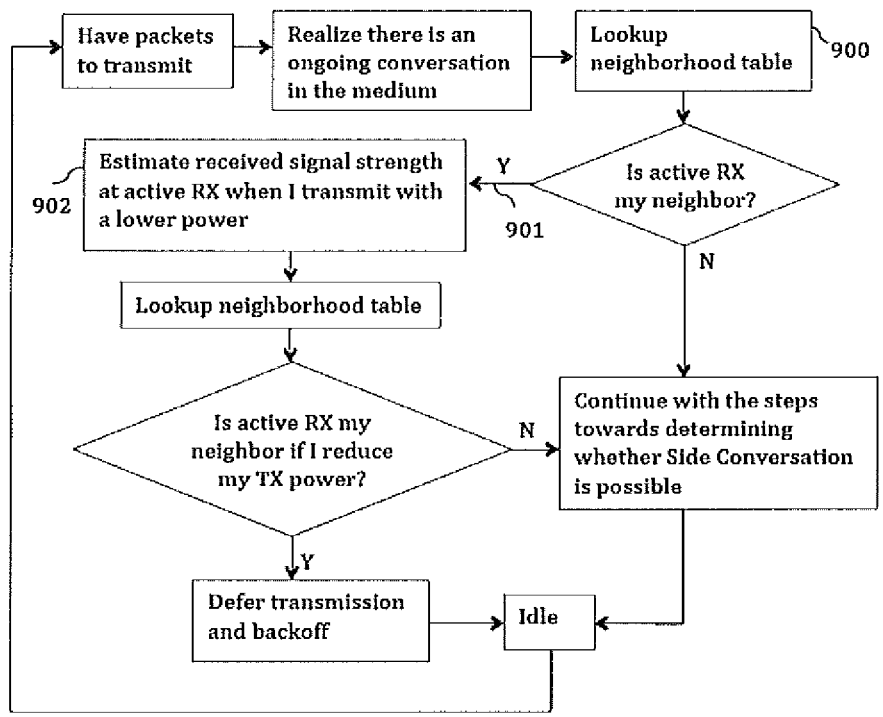
FIG. 9 represents how a Side Conversation is initiated in a further embodiment of the proposed invention where nodes are capable of dynamically adjusting their transmission power to control their communication range.

FIG. 9 represents the decision mechanism of how a Side Conversation is initiated in a further embodiment of the proposed invention, where nodes are capable of dynamically adjusting their transmission power to control their communication range. Specifically, node 1108 has packets to transmit to 1109 in FIG. 11; it detects the ongoing communication from 1102 to 1103, looks up its neighborhood table and learns the RSSI of the links to 1103 and to 1109. 1108 calculates whether it may reduce its transmission power to decrease the RSSI on link 1110 to lower than the noise threshold, while not degrading the throughput on link 1112 significantly. If this is possible, 1108 switches to the lower power that satisfies this criterion. Power adjustment is more meaningful in a topology where the link 1112 is much stronger compared to the link 1110. Via reduction of transmit power, 1108 thus turns what could not be a Side Conversation into a Side Conversation. (A Side Conversation is possible when two communications can be carried out in an interference-free fashion.)

Figure 10:
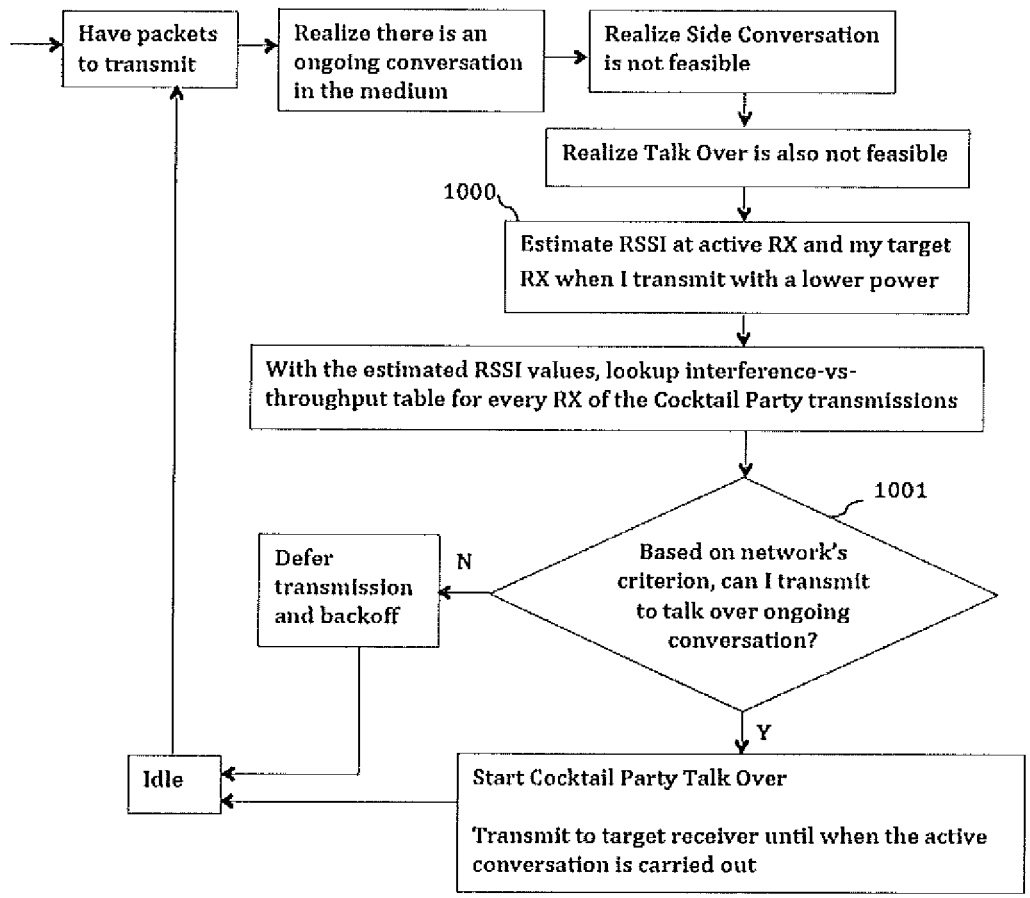
FIG. 10 represents how a Talk Over is initiated in a further embodiment of the proposed invention where nodes are capable of dynamically adjusting their transmission power to control their communication range.

FIG. 10 represents the flow diagram of how a Talk Over is initiated in a further embodiment of the proposed invention where nodes are capable of dynamically adjusting their transmission power to control their communication range. A Cocktail Party-capable node that is able to tune its transmission power can potentially turn an unjustified Talk Over to a justifiable Talk Over. As an example, in network 1100 in FIG. 11, the signals of node 1108 can be received at both 1103 and 1106. While there is an ongoing transmission from node 1102 to node 1103, assume that upon lookup of its neighborhood table and calibrated interference-versus-throughput table, node 1108 infers that it cannot Talk Over the transmission on link 1104. Potential transmitter node 1108 may be able to reduce its transmission power such that although a conversation on link 1107 cannot be a Side Conversation, the lookup of interference strength-versus-achievable throughput table now (with the calculated lower interference imposed on active receiver 1103) satisfies the system-specific criterion for initiating a concurrent communication on link 1107. If this is satisfied, 1108 may reduce its transmission power accordingly and initiate a Cocktail Party Talk Over with the lower transmission power.

The potential Cocktail Party speaker gets the next packet to transmit from its packet queue based on a network-specific criterion. In the simplest form of the proposed invention, the potential Cocktail Party speaker picks the next packet in its packet queue that works in a First-In First-Out (FIFO) fashion; if a Cocktail Party conversation with the target of this packet is not possible, the node defers its transmission. With this implementation, in FIG. 5, the potential transmitter node may get its packet at module 500 or at module 503. After the decision at module 504, it defers the transmission of this packet if it determines that a Cocktail Party transmission to the destination of the packet is not feasible. In further embodiments, the packet buffer in the memory of the Cocktail Party capable device allows non-sequential access to its contents. The potential transmitter node, which has learned about the TX, RX and the duration of the active transmission in the medium, traverses its packet queue to pick a packet according to the network-specific criteria and attempts to initiate a Cocktail Party transmission to the target of the selected packet. In one implementation, the potential transmitter node may traverse its traffic queue to find the packets that it can transmit immediately to their targets over a Cocktail Party transmission (i.e., packets whose destinations do not receive the signals or poorly receive the signals of the active transmitter). In another embodiment of the proposed invention, the potential transmitter may traverse its traffic queue to transmit the packets that can fit in the duration of the ongoing communication. In another embodiment, the target receiver may be chosen to favor power controlled Side Conversations to Talk Over in the network, in order to reduce the overall power consumption or the projected electromagnetic radiation.

The current disclosure describes the mechanism of how a node determines whether to be a second transmitter in the unit area. In further embodiments of the proposed invention, concurrent transmission of more than two transmitters is enabled in a unit area with small changes to the proposed mechanism (e.g., timing mechanisms to ensure MAC headers are not received at the same time, or mechanisms that facilitate decoding the MAC header even when more than one MSDUs—or data frames—are received exactly at the same time), such that nodes in the neighborhood of multiple Cocktail Party transmitters can always extract the fields in the MAC header and update their Extended NAV correctly.

In all embodiments, in order for non-Cocktail Party and Cocktail Party communications to fairly coexist in the network, Side Conversation or Talk Over must be carried out for a duration of that is less than t1 minus the standard-specified Short Inter-Frame Spacing, i.e., SIFS, minus the duration of an ACK transmission (shown in FIG. 7). t1 is the value extracted from the "Duration/ID" field of the active transmitter's MAC headers, which is a sum of the duration of the active transmitter's transmission, plus SIFS, plus the time for the target receiver to transmit an ACK frame to acknowledge successful reception of the data fragment. The IEEE 802.11 DCF MAC protocol specifies that a receiver must wait for the duration of SIFS after the last data frame from the transmitter is received, before sending its ACK. The duration of the ACK transmission can be estimated at the device based on the implemented standard. (E.g., the 802.11n standard defines the ACK packet to be sent at the highest rate in the BSSBasicRateSet that is less than or equal to the rate of non-HT reference rate of the previously transmitted frame that was directed to the same receiving STA.) Since the two transmitters of concurrent communications hear each other, the additional, Cocktail Party communication must fit within the same duration as that of the existing communication, in order to prevent a collision of the ACK from the first receiver with the data transmission of the second transmitter (and a potential collision between the second receiver and the first transmitter in the symmetric case).

The Cocktail Party transmission may transmit as many packets as would fit within the time until which NAV is set to indicate an ongoing communication in the medium. These packets may be targeted for different neighbors which all satisfy the Cocktail Party prerequisites. Within this duration, the Cocktail Party transmitter may transmit to one such neighbor via a Side Conversation and to another neighbor via Talk Over.

The packet flow in FIG. 7 depicts the timing and duration of communications in the medium with the CSMA/CA mechanism and with Cocktail Party algorithm. According to CSMA/CA, node 208 (from FIG. 2) that hears the ongoing transmission of 202 defers its transmission for the duration of 202's transmission (which is equal to t1 in this figure). At the time when 202's transmission and its corresponding acknowledgement handshake is complete, potential transmitter 208 defers for an additional Distributed Coordination Function Inter-Frame Spacing (i.e., DIFS) amount of time, specified by the IEEE 802.11 standard (a node must wait for an additional DIFS amount of time before transmitting, if it senses the medium to be idle after a busy duration). When DIFS is over, 208 starts counting down a "Backoff timer" and starts to transmit if the channel has remained available for the duration of the Backoff. Backoff is an additional random deferral time to resolve medium access conflicts; its duration is calculated by randomly generated number (represented by rand( ) in FIG. 7) times the duration of backoff time-slots (represented by $T_{slot}$ in FIG. 7). With the proposed invention (shown in the lower packet flow), 208 starts transmitting immediately, after following the decision mechanism in FIG. 5 or FIG. 6, and can transmit for the duration of 202's transmission. With the IEEE 802.11 wireless MAC protocol, the total time it takes for the communications on links 204 and 206 to complete equals [2*t1+DIFS+random backoff]. If Cocktail Party medium access mechanism is enabled, the same two communications can be carried out within only [t1]. The throughput increase occurs with a percentage based on the topology of the network; with every additional concurrent conversation, the throughput increase is up to 100% in the case of Side Conversations or it is a percentage based on the system specific criteria for the case of Talk Over.

The 802.11 standard defines that the ACK packet shall be sent at the highest rate in the BSSBasicRateSet that is less than or equal to the rate of non-HT reference rate of the previously transmitted frame that was directed to the same receiving STA. In a further embodiment of the proposed invention, all receivers may send their ACK packet at a smaller MCS than what the standard defines, and while sending an ACK they may reduce their transmission power to the minimum level at which packets at this MCS are decodable at the receiver (that is the transmitter of the conversation this node is acknowledging for). This would decrease the possibility of data-ACK collisions at concurrent transmitters due to a possible synchronization inefficiency that is needed to ensure that concurrent communications end at the same time.

The features proposed for different embodiments of Cocktail Party algorithm described in this disclosure may be combined in a single Cocktail Party device. E.g., a Cocktail Party device may have nonlinear access to its packet queue and be able to select the packet satisfying a certain criterion for its next transmission; the same device may be able to perform power adjustment in order to turn a non-feasible Cocktail Party transmission to a feasible Cocktail Party transmission.

The disclosed invention is conducive to distributed implementation due to its independent decision mechanism at individual nodes; it requires no centralized control mechanism or no message exchange among nodes to handshake to transmit simultaneously.

The implemented decision mechanism is executed independently at each node based on the dynamic network information and the attained neighborhood information.

The Cocktail Party communication algorithm is executed at a node that is a potential transmitter, i.e., the node that has packets to send. Cocktail Party algorithm proposes no changes to the receiver end of a wireless communication.

The Cocktail Party communication algorithm's realization in practice requires no changes to the existing hardware. It can be implemented entirely with a software update to existing systems.

Cocktail Party capable devices can operate in the same network (e.g., mesh network) with non-Cocktail Party (i.e., legacy) devices, without disrupting the standard protocol or causing an unfair distribution of airtime usage. In fact, Cocktail Party communications leave more (free) airtime for legacy devices, as they utilize the medium concurrently with the transmissions from legacy devices. In order to facilitate Cocktail Party transmissions to legacy devices in a hybrid network consisting of both Cocktail Party-capable and legacy devices, Cocktail Party-capable devices must be provided with the neighborhood information via manual configuration or other controlled deployment mechanisms, as legacy devices do not propagate neighborhood information in their beacons. Neighborhood information is essential in making accurate decisions with regards to which Cocktail Party transmissions are feasible in the network while certain legacy transmission is active in the medium.

This disclosure provides the details of implementation of the proposed invention on Wi-Fi systems that use the IEEE 802.11 DCF MAC standard. While the above embodiments show wireless networks, the invention is applicable to other types of networks. Cocktail Party communications can be realized in networks that use other technologies and standards, to increase performance where devices share a communication medium (collision domain), with only simple changes for acquiring and maintaining local neighborhood information and implementing the decision mechanism before initiating a communication while there is an ongoing communication in the medium.

The invention claimed is:

1. An access point N1 for use in a wireless network to be established between N1 and at least three other access points N2, N3 and N4, access point N1 comprising:
   a data storage memory;
   a program memory;
   a circuit operatively coupled to a port;
   a processor operative coupled to the circuit and the at least one memory;
   a first set of instructions stored in the program memory that, when executed by the processor, configure N1 to determine whether N3 is actively communicating with N4 and, if so, then determining whether packets are stored in the data storage memory that are to be transmitted by N1 to N2;
   a second set of instructions stored in the program memory that, when executed by the processor, configure N1 to determine whether N4 is not capable of receiving signals transmitted from N1 and, if so, then determining how many packets can be sent to N2 from N1 with their receipt by N2 acknowledged in the remaining time that N3 is actively communicating with N4 and gathering those packets;
   a third set of instructions stored in the program memory that are adapted to be executed after the second set of instructions are executed to gather packets, the third set of instructions, when executed by the processor, causing N1 to transmit the gathered packets to N2 at the same time that N3 is actively communicating with N4.

2. The access point of claim 1, wherein the wireless network comprises a wireless mesh network.

3. The access point of claim 2, wherein the wireless mesh network is compliant with the 802.11 standards.

4. The access point of claim 1, wherein the second set of instructions determines a length of time that N3 is actively communicating with N4 by reference to time information stored in a media access control header.

5. A first node of a network for concurrent transmission of multiple radio-frequency signals between a plurality of transmitting and receiving nodes, the first node comprising:
   a processor configured to execute computer readable code, that when executed by the processor, configures the processor to,
      collect available information from one-hop neighboring nodes located within one hop from the first node;
      maintain and become aware of two-hop neighboring nodes within at least two-hops from the first node based on the available information;
      select and establish communication with a second node after completing a set of instructions using the available information, the second node being one of the one-hop neighboring nodes, wherein
   the communication between the first node and the second node is independent from a concurrent communication between a third node and a fourth node, the third node and the fourth node being other ones of the at least one one-hop neighboring nodes, and
   the set of instructions include,
      a first set of instructions stored in a program memory that, when executed by the processor, configure the first node to determine whether the third node is actively communicating with the fourth node and, if so, then determining whether packets are stored in a data storage memory that are to be transmitted by the first node to the second node,
      a second set of instructions stored in the program memory that, when executed by the processor, configure the first node to determine whether the second node is not capable of receiving signals transmitted from third node and, if so, then determining how many packets the first node can send to the second node with their receipt by the second node acknowledged in the remaining time that the third node is actively communicating with the fourth node and gathering those packets, and
      a third set of instructions stored in the program memory that are adapted to be executed after the second set of instructions are executed to gather packets, the third set of instructions, when executed by the processor, causing the first node to transmit the gathered packets to second node at the same time that the third node is actively communicating with the fourth node.

6. The first node of claim 5, wherein the second node is one of the at least one-hop neighborhood nodes of the first node.

7. The first node of claim 5, wherein the first node receives the available information via a beacon.

8. The first node of claim 5, wherein the available information collected by the first node includes one or more of neighbor identification, neighbor signal strength, duration of transmission, transmitter's identification and receiver's identification.

9. The first node of claim 5, wherein the first node is configured to maintain and become aware of the two-hop neighboring nodes from one or more of beacons, packets and a manual setup.

10. The first node of claim 5, wherein said network comprises a mesh network.

11. The first node of claim 10, wherein the mesh network is compliant with the 802.11 standards.

12. The first node of claim 5, wherein the set of instructions further include,
a fourth set of instructions stored in the program memory that, when executed by the processor, configure the first node to determine and store the available information of surrounding nodes, wherein the available information includes nodes identification, achievable throughput between nodes, and interference strength;
a fifth set of instructions stored in the program memory that, when executed by the processor, configure the first node to determine whether the fourth node is capable of receiving signals transmitted from the first node and, if so, then the fifth set of instructions configures the first node to determine if the first node initiates communication with the second node based on the available information; and
a sixth set of instructions stored in the program memory that are adapted to be executed after the second set and the fifth set of instructions are executed to gather packets, the sixth set of instructions, when executed by the processor, causing the first node to transmit the gathered packets to second node at the same time that third node is actively communicating with the fourth node.

13. The access point of claim 1, wherein if, using the second set of instructions, N1 determines that N4 is capable of receiving signals transmitted from N1, then, using a fourth set of instructions stored in the program memory, N1 is further configured to,
determine if N1 transmitting the gathered packets to N2 will reduce throughput of the network below a threshold, and
transmit the gathered packets to N2 at the same time that N3 is actively communicating with N4 if the transmission between N1 and N2 will not reduce the throughput below the threshold.

14. The access point of claim 13, wherein the throughput is an aggregate throughput for the network.

15. The access point of claim 14, wherein the throughput is the aggregate throughput per airtime spent, and
N1 is configured to transmit the gathered packets to N2 if the aggregate throughput per airtime spent increases if N1 transmits the gathered packets to N2.

16. The access point of claim 1, wherein if, using the second set of instructions, N1 determines that N4 is capable of receiving signals transmitted from N1, then, using a fourth set of instructions stored in the program memory, N1 is further configured to,
determine a reduced transmit power such that N4 is not capable of receiving signals transmitted from N1, and
transmit, at the reduced transmit power, the gathered packets to N2 at the same time that N3 is actively communicating with N4.

17. The access point of claim 1, wherein the program memory contains instructions, that when executed by the processor, cause the processor to,
receive, via the port, a plurality of packets in a first order,
store, in a packet buffer memory, the plurality of packets such that the plurality of packets are stored in the first order,
store a pointer associated with each one of the plurality of packets in the pointer buffer memory,
place the pointers stored in the pointer buffer memory in a second order with a timestamp that is not recognizable at a player level, and
transmit the packets from the packet buffer memory in accordance with the sorted pointers.

18. The access point of claim 1, wherein the first node is configured to transmit the gathered packets in accordance with stored pointers such that a delay associated with the transmission of the gathered packets is equalized.

19. The access point of claim 1, wherein if, using the second set of instructions, N1 determines that N4 is capable of receiving signals transmitted from N1, then, using a fourth set of instructions stored in the program memory, N1 is further configured to,
determine if N1 transmitting the gathered packets to N2 will reduce throughput of the network below a threshold, and
transmit the gathered packets to N2 at the same time that N3 is actively communicating with N4 if the transmission between N1 and N2 will not reduce the throughput below the threshold such that, based on pointers associated with the gathered packets, a delay associated with the transmission of the gathered packets is equalized.

20. A method for concurrent transmission of multiple radio-frequency signals between a plurality of nodes, each node including a data storage memory, a program memory, a circuit operatively coupled to a port, and a processor operative coupled to the circuit, the method comprising;
determining and storing, by a first node from the plurality of nodes, wireless available information of surrounding nodes, wherein the wireless available information includes nodes identification, achievable throughput between nodes, and interference strength;
determining, by the first node, whether a third node from the plurality of nodes is actively communicating with a fourth node from the plurality of nodes and, if so, then determining whether packets are stored in the data storage memory that are to be transmitted by the first node to a second node from the plurality of nodes;
determining, by the first node, whether the fourth node is capable of receiving signals transmitted from the first node and, if so, then the first node based on wireless available information between the first node to the second node and the third node to the fourth node determines if the first node initiates communication with the second node; and
transmitting, by the first node, the gathered packets to the second node at the same time that third node is actively communicating with the fourth node.

21. The method of claim 20, wherein the second node is one of the at least one-hop neighborhood nodes of the first node.

22. The method of claim 21, wherein first node is one of an access point, a gateway, a video bridge and a station.

23. The method of claim 21, wherein the wireless network comprises a wireless mesh network.

24. The method of claim 23, wherein the wireless mesh network is compliant with the 802.11 standards.

25. The method of claim 20, wherein the transmitting, by the first node, includes transmitting with adjustable transmission power.

* * * * *